(12) United States Patent
Sander

(10) Patent No.: US 11,503,831 B2
(45) Date of Patent: Nov. 22, 2022

(54) ARTHROPODA REPELLENT COMPOSITION

(71) Applicant: SanderStrothmann GmbH, Georgsmarienhütte (DE)

(72) Inventor: Michael Sander, Bielefeld (DE)

(73) Assignee: SANDERSTROTHMANN GMBH, Georgsmarienhütte (DE)

( * ) Notice: Subject to any disclaimer, the term of this patent is extended or adjusted under 35 U.S.C. 154(b) by 0 days.

(21) Appl. No.: 16/921,483

(22) Filed: Jul. 6, 2020

(65) Prior Publication Data
US 2021/0007354 A1 Jan. 14, 2021

(30) Foreign Application Priority Data
Jul. 11, 2019 (EP) .................................... 19185690

(51) Int. Cl.
*A01N 43/40* (2006.01)
*A01N 25/02* (2006.01)
*A01N 31/06* (2006.01)

(52) U.S. Cl.
CPC ............. *A01N 43/40* (2013.01); *A01N 25/02* (2013.01); *A01N 31/06* (2013.01)

(58) Field of Classification Search
CPC ......... A01N 43/40; A01N 25/02; A01N 31/06
See application file for complete search history.

(56) References Cited

U.S. PATENT DOCUMENTS

| | | | |
|---|---|---|---|
| 4,474,081 A | 10/1984 | Kinugasa et al. | |
| 4,774,082 A | 9/1988 | Flashinski et al. | |
| 8,293,802 B2 * | 10/2012 | Modak .................. | A61K 8/347 514/722 |
| 2008/0319015 A1 | 12/2008 | Gruenewald et al. | |
| 2009/0082284 A1 * | 3/2009 | Sorns ..................... | A61Q 19/00 514/23 |
| 2013/0064876 A1 * | 3/2013 | Viladot Petit ........... | A61P 17/00 424/443 |
| 2017/0354141 A1 | 12/2017 | Davies et al. | |
| 2020/0163334 A1 * | 5/2020 | Albright ................. | A61Q 17/04 |

FOREIGN PATENT DOCUMENTS

| | | |
|---|---|---|
| BR | 102016004354-9 A2 | 9/2017 |
| DE | 2942835 A1 | 5/1980 |
| DE | 10 2005 030 016 A1 | 1/2007 |
| EP | 1738744 B1 | 11/2010 |
| EP | 2439188 A1 | 4/2012 |
| EP | 3056189 A1 | 8/2016 |
| EP | 2969026 B1 | 11/2017 |
| WO | WO-2004/006674 A1 | 1/2004 |
| WO | WO 2017/143421 A1 | 8/2017 |
| WO | WO-2017/199145 A1 | 11/2017 |
| WO | WO-2018/050211 A1 | 3/2018 |

OTHER PUBLICATIONS

Lee, M.Y. "Essential Oils as Repellents against Arthropods" BioMed Research International, vol. 2018, Article ID 6860271, pp. 1-9 (Year: 2018).*
Songkro, S. et al. "Effects of Glucam P-20, Vanillin, and Fixolide on Mosquito Repellency of Citronella Oil Lotions" J. Med. Entomol. 2012, 49(3), 672-677 (Year: 2012).*
Stiftung Warentest, "Medikamente im Test, Insektenabwehrmittel—Repelllentien", 2017, pp. 1-3.
Safety Data Sheet 1907/2006/EG, Reach, "Anti-Brumm TM Zecken Stopp", 2016, pp. 1-12.
Songkro, S. et al., "Effects of Giucam P-20, Vanillin, and Fixolide on Mosquito Repellency of Citronella Oil Lotions", Journal of Medical Entomology, 2012, 49(3):672-677, Vector/Pathogen/Host Interaction, Transmission, Entomological Society of America.
Stiftung Warentest, "Insect Repellent—Repellents", Mar. 16, 2017, pp. 1-3, along with its English translation.
Safety Data Sheet 1907/2006/EG, Reach, Anti-Brumm® Zecken Stopp/Anti-Tiques, Hermes Arzneimittel GmbH, Aug. 17, 2016, pp. 1-12, along with its English translation.
"Emulfying 20% Icaridin in water" chemistscorner.com, Aug. 2014, 3 pages.
Lubrizol Safety Data Sheet, revised Feb. 19, 2016, 8 pages.
Lupi, E. et al. "The efficacy of repellents against *Aedes, Anopheles, Culex* and *Ixodes* spp.—A literature review" Travel Medicine and Infectious Disease, 2013, 11 (6):374-411.
Ranger Ready Picaridin Insect Repellent, Wayback Machine—Sep. 30, 2020, 4 pages.
Ranger Ready Picaridin 20%, Amazon.com Date First Available—Mar. 23, 2018, 8 pages.
Ranger Ready Picaridin 20%, Amazon Customer Reviews, accessed Apr. 28, 2022, 3 pages.

* cited by examiner

*Primary Examiner* — Andrew S Rosenthal
(74) *Attorney, Agent, or Firm* — Saliwanchik, Lloyd & Eisenschenk

(57) ABSTRACT

The present invention refers to an Arthropoda repellent composition providing long-term protection, in particular against insects and ticks.

20 Claims, No Drawings

ARTHROPODA REPELLENT COMPOSITION

CROSS-REFERENCE TO RELATED APPLICATION

This application claims the benefit under 35 U.S.C. § 119 of European Patent Application No. 19185690.5, filed Jul. 11, 2019, which is hereby incorporated by reference in its entirety.

BACKGROUND OF THE INVENTION

The present invention refers to an Arthropoda repellent composition providing long-term protection, in particular against insects and ticks.

In this specification, the term "Arthropoda" is used to refer to insecta, arachnida and myriapoda species, in particular insecta and arachnida, preferably any type of mosquitoes and ticks.

By "insect repellent composition" is meant a composition which shows an insect repellent effect, or an insecticidal effect, or both an insect repellent effect and an insecticidal effect.

Repellents are expected to satisfy several basic requirements such as commercial availability, low cost, absence of malodours, classification as a non-irritant and nontoxic material, high stability, and an acceptable evaporation rate in association with an adequate repellent effect for long-lasting effectiveness. Addressing the last one, i.e. to keep the rate at which a repellent is released from a repellent formulation under control at effective levels is a great challenge faced by the repellent industry. Further, it is known that volatile insect repellents disappear relatively rapidly when applied to the skin. They are also easily washed away by water, e.g. by rain, during sweating, swimming or showering. The evaporation of the insect repellent is directly related to the ambient temperature, body temperature and wind velocity.

A further challenge is that approximately 50 percent of a topically applied dose is absorbed by the skin in six hours with peak plasma levels being reached in 1 hour (Lurie et al, Pharmacokinetics of insect repellent N,N-diethyl toluamide. Med. Parazitol., 47, 72, 1979). It is known that ethanol often used as co-solvent may significantly increase and accelerate penetration of the active ingredients into the skin. This at one hand results in a loss of active substance on skin surface, at the other hand may lead to skin irritation and allergic reactions. For this reason, in modern formulations alcohols sometimes are at least partly replaced by surfactants. However, the use of surfactants also hides disadvantages in the form of possible skin irritation or allergic reactions.

There have been some developments using physical barriers to control the release of repellents. Incorporation of volatile repellents into polymers, encapsulating the volatile repellent in a shell or walled material and the use of porous and or layered materials as volatile active carriers are examples of attempts to provide controlled-release repellent formulations.

One well known insect repellent in use is N,N'-diethyl toluamide, commonly known as DEET. Other volatile insect repellents are known including ethyl hexanediol; 2-(octylthio)ethanol; dimethyl phthalate; di-n-propyl-2,5-pyridine dicarboxylate; 1,5a,6,9,9a, 9b-hexahydro-4a(4b)-dibenzofuran carboxaldehyde; citronellal; citronellol; geraniol; nerol; and linalool. The formulation of such insect repellents is particularly problematic due to the greasy feel of many of the repellents and especially the effect of DEET in staining clothing, crazing plastics and washing away in humid or rainy weather or when the person using the repellent is participating in water sports such as swimming or fishing. In addition, the lack of retention of insect repellents due to the action of water is also affected by the individual wearer's sweating.

Mehr et al, (Laboratory Evaluation of Controlled-Release Insect Repellent Formulations, J. Am. Mosq. Control Assoc., 1,143, 1985) evaluated a number of controlled release formulations of microencapsulated DEET and hydrophilic vinyl polymers such as polyvinylpyrrolidone. The polyvinylpyrrolidone formula was no better than unformulated DEET in repelling mosquitoes.

Reifenrath et al, (Evaporation and Skin penetration characteristics of mosquito repellent formulations. J. Am. Mosq. Control Assoc., 5, 45 1989) tested silicone polymers, acrylate polymers, fatty acids and mixtures of repellents and evaluated evaporation and skin penetration. No differences in evaporation and skin penetration was found between formulations containing the polymers and unformulated DEET or with a mixture of dimethyl phthalate and DEET.

EP 2 439 188 A1 describes embedding of the active substance in a cellulosic matrix and U.S. Pat. No. 4,474,081 discloses the use of maleic anhydride/alpha olefin polymers and terpolymers to provide slow release of contact insect repellents when applied to the surface of the skin.

U.S. Pat. No. 4,774,082 discloses the use of maleic anhydride/alpha olefin polymers and terpolymers to provide slow release of volatile insect repellents applied to the surface of the skin. Chemical Abstracts 110, 207847s (1989), discloses mosquito repellent compositions which have an active agent and an oil-soluble, water insoluble acrylate polymer comprising acrylic acid, stearyl methacrylate and isooctyl acrylate.

Also, derivatisations for the purpose of increasing the duration of action have been considered. Hence, for example WO 2004/006674 A describes the production of Cg-so esters of PMD. Furthermore, JP 3 133 5 906 A describes an insect repellent which contains N,N-diethyltoluamide (DEBT) and a p-menthane derivative, such as for example a monocarboxylic acid or a sulphonate of p-menthane-3,8-cis-diol.

WO 2017/199145 A describes the combination of at least a first compound and a second, different compound, at least the first compound being an insect repellent, the first compound and the second compound being capable of together forming a negative pseudo-azeotrope with a vapour composition at ambient pressure and temperature in which the first compound is present in a sufficiently high concentration to provide an insect repellent effect. In this application several of the known insect repellent compounds have been combined, however, have been found being not suitable, since they do not form a negative pseudo-azeotrope.

WO 2018/50211 A discloses an insect repellent composition comprising insect repellents or an insecticide and a cyclodextrin or cyclodextrin derivative, wherein the insect repellent/insecticide is provided in a noticeable excess ratio compared to said cyclodextrin (derivative). All the formulations shown in said application comprise an alcohol content of at least 80 wt. %.

The object of the present invention was to provide an insect repellent formulation for mammalian use which should be non-irritating, highly efficient, non-staining, non-greasy, slightly tacky, long lasting, and balancing solubility and penetration of the repellent compound into the skin.

This object is met by an Arthropoda repellent composition, comprising (i) lcaridin (1-(1-methylpropoxycarbonyl)-2-(2-hydroxyethyl)piperidine), (ii) optionally at least one further Arthropoda repellent compound selected from, PMD (para-menthan-3,8-diol), DEET (N,N-diethyl-m-methylbenzamide), IR 3535 (ethyl-3-acetylbutylaminopropanoate), KBR 3023 ((RS)-sec-butyl-(RS)-2-(2hydroxyethyl) piperidine-1-carboxylate) or ethyl antranilate (ethyl-2-aminobenzoate), and (iii) at least one polyol, selected from PPG-20 methyl glucose ether, PPG-10 methyl glucose ether, propylene glycol, butylene glycol and pentylene glycol.

The present invention refers to compositions comprising the Arthropoda repellent compound (i) Icaridin (1-(1-methylpropoxycarbonyl)-2-(2-hydroxyethyl)piperidine), and optionally, but preferred at least one further Arthropoda repellent compound (ii), selected from PMD (para-menthan-3,8-diol), DEET (N,N-diethyl-m-methylbenzamide), IR 3535 (ethyl-3-acetylbutylaminopropanoate), KBR 3023 ((RS)-sec-butyl-(RS)-2-(2hydroxyethyl) piperidine-1-carboxylate) or ethyl antranilate (ethyl-2-aminobenzoate). It is preferred that the composition comprises besides Icaridin at least PMD, particularly preferred the composition comprises these two in combination.

Besides the mentioned repellent compounds (i) and (ii) the composition may comprise at least one further compound known in the art as having a repellent effect for Arthropodae, e.g. N-butyl-acetanilide, MGK Repellent 264, N-Methylneodecanamide, AI3-35765, AI3-37220 (SS220), MGK Repellent 326, thymol, eugenol, spathulenol, dibutyl phthalate (DBP), dimethyl phthalate (DMP), dimethyl carbate (DMC), dioctyl phthalate, benzyl benzoate, indalone, nepetalactone, methyl anthranilate, 2-butyl-2-ethyl-1,3-propandiol, Rutgers 612, citronella oil, *Eucalyptus* oil, campher oil, neem oil, lemongrass oil, citral, geraniol, citronellol, citronellal, piperitone or a pyrethroid, like e.g. Empenthrin, Profluthrin, Transfluthrin, Furamethrin, Metofluthrin, Allethrin, Prallethrin, Phenothrin or Permethrin, without being restricted to the mentioned, however, a further compound is not necessary.

Each of the repellent compound(s) (i) and (ii) as mentioned above independently can be present in the composition in an amount of from 2.5 wt. % to 40 wt. %, preferably from 5 wt. % to 30 wt. %, more preferred from 8 wt. % to 20 wt. %, respectively, wherein the total amount of Arthropoda repellent compounds (i) and (ii) in the composition ranges from 10 wt.-% to 80 wt. %, preferably from 20 wt. % to 60 wt. %, more preferred from 25 wt. % to 50 wt. % referring to the weight of the total composition.

It is preferred that Icaridin is present in the composition in an amount of from 10 to 30 wt. %, preferably 15 to 25 wt. %, more preferred 18 to 22 wt. %. It is also preferred that PMD is present in the composition, in particular in an amount of from 5 to 20 wt. %, preferably 7 to 15 wt. %, more preferred from 8 to 12 wt. %. Icaridin is available under the tradename Saltidin® from Lanxess (Germany), wherein PMD may be obtained as Galea concentrate EC CP 680 from Citrefine (Great Britain) as a 50% solution. It should be mentioned that *Eucalyptus citriodora* oil, offered as Citriodiol® by Citrefine also comprises para-menthan-3,8-diol, however, not in water-soluble form.

According to the invention the repellent compound(s) (i) and (ii) together are present in the composition in a total amount of from 10 wt.-% to 80 wt. %, preferably from 20 wt. % to 60 wt. %, more preferred from 25 wt. % to 50 wt. % referring to the weight of the total composition. If from the list cited above for the repellent compound (i) Icaridin and (ii) PMD are combined, it is preferred that the composition comprises these two compounds in a combined amount of from 10 wt.-% to 80 wt. %, in particular 15 wt. % to 50 wt. %, preferably 20 wt. % to 40 wt. %, more preferred 25 wt. % to 35 wt. % of the total weight of the composition.

If Icaridin and PMD both are present in the composition, it is preferred that they are present in a weight ratio of from 3:1 to 1:2, preferably in a weight ratio from 2.5:1 to 1:1.5, more preferred in a weight ratio from 2.2:1 to 1:1.2 most preferred in a weight ratio of about 2:1.

A further ingredient of the composition of the present invention is (iii) a polyol, selected from PPG-20 methyl glucose ether, PPG-10 methyl glucose ether, propylene glycol (propandiol), butylene glycol (butandiol) and pentylene glycol (pentandiol). It is preferred that the composition (iii) comprises at least PPG-20methyl glucose ether. If an additional polyol (iii) is present, it is preferred that the composition further comprises at least one of the polyols propylene glycol and pentylene glycol, if desired both of them.

Each of the polyols (iii) independently are present in the composition in an amount of from 0.1 wt. % to 10 wt. %, preferably from 0.2 wt. % to 8 wt. %, more preferred from 0.3 wt. % to 7 wt. %, most preferred from 0.4 wt. % to 6 wt. %, respectively, wherein the total amount of said polyols (iii) in the composition ranges from 0.2 wt.-% to 20 wt. %, preferably from 0.4 wt. % to 16 wt. %, more preferred from 0.5 wt. % to 12 wt. % referring to the weight of the total composition. It is preferred that the composition comprises at least PPG-20 methyl glucose ether, e.g. obtainable as Glucam® P-20 from Lubrizol (Ohio, USA), preferably in an amount of from 0.1 wt. % to 1.5 wt. %, more preferred from 0.2 wt. % to 1 wt. %, even more preferred from 0.25 wt. % to 0.8 wt. %, even more preferred from 0.3 wt. % to 0.7 wt. %, and most preferred from 0.4 wt. % to 0.6 wt. %. Further, if an additional polyol (iii) is present, it is preferred that the composition comprises at least one of the polyols propylene glycol and pentylene glycol, wherein these two independently from each other are added preferably in an amount of from 2 to 10 wt. %, preferably 3 to 8 wt. %, more preferred 4 to 6 wt. %, respectively.

In a preferred embodiment of the invention the composition comprises (i) Icaridin, (ii) PMD and (iii) PPG-20 methyl glucose ether. The composition may further comprise an additional polyol (iii), selected from PPG-10 methyl glucose ether, propylene glycol, butylene glycol and pentylene glycol. If an additional polyol (iii) is present the composition preferably comprises additionally at least one of propylene glycol and pentylene glycol, if desired both.

It has been found that the addition of the polyol(s) (iii) to the composition comprising the repellent compound(s) (i) and optionally (ii) results in a better efficiency of the formulation and also in a remarkable extension of the period of effectiveness of said repellent component(s). In particular, the addition of PPG-20 methyl glucose ether increases the effective time period of a composition comprising (i) Icaridin noticeably. A composition comprising both of Icaridin and PMB, and further comprising at least PPG-20 methyl glucose ether and optionally at least one of propylene glycol and pentylene glycol shows an increase of efficiency and an extension of the period of effectiveness far beyond the expectable values.

To balance solubility of the compounds and the probability and extent of penetration of the repellent compounds into the skin, the composition according to the invention preferably comprises a content of any $C_1$ to $C_5$ alcohol of maximum 30 wt. %. Thus, the total $C_{1-5}$ alcohol content of the composition preferably is not more than 30 wt. %, preferably not more than 25 wt. %, not more than 20 wt. %, not more than 15 wt. %, not more than 10 wt. %, not more than 8 wt. % or not more than 5 wt. % (total content of all added $C_{1-5}$ alcohols) more preferred not more than 3 wt. %, even more preferred not more than 2 wt. %. Nonetheless, it is preferred to add an amount of at least one of the $C_{1-5}$ alcohols methanol, ethanol, propanol or isopropanol, n- or t-butanol or pentanol to increase solubility of the organic compounds in an aqueous medium. Therefore, the composition may comprise a $C_{1-5}$ alcohol in an amount of from 0.02 to 30 wt. %, preferably at least 0.1 wt. %, more preferred at least 0.5 wt. %, even more preferred at least 1 wt. % of any $C_{1-5}$ alcohol, in particular ethanol (optionally denatured or mixed with isopropanol and/or butanol) or isopropanol.

Further, since surfactants also increase the penetration of the repellent compound(s) (i) and/or (ii) into the skin, it is particularly preferred that the composition comprises less than 5 wt. % of any surfactant. In a preferred embodiment the composition comprises less than 4 wt. %, preferably less than 3 wt. %, even more preferred less than 2.5 wt. % of any surfactant, and less than 2 wt. %, preferred less than 1.5 wt. %, more preferred less than 1 wt. %, even more preferred less than 0.5 wt. % of anionic, amphoteric or cationic surfactants, wherein it is preferred that it does not comprise any surfactant, selected from anionic, amphoteric or cationic surfactants. Thus, if a surfactant is present, it is preferred that said surfactant is a non-ionic surfactant. It is preferred that if a surfactant is present, it is one serving as an emulsifying agent.

Examples for such non-ionic emulsifiers/surfactants, are:
- products of the addition of 2 to 30 mol ethylene oxide and/or 0 to 5 mol propylene oxide onto linear $C_{8-22}$ fatty alcohols, onto $C_{12-22}$ fatty acids and onto alkyl phenols containing 8 to 15 carbon atoms in the alkyl group;
- 12/18 fatty acid monoesters and diesters of addition products of 1 to 30 mol ethylene oxide onto glycerol;
- glycerol mono- and diesters and sorbitan mono- and diesters of saturated and unsaturated fatty acids containing 6 to 22 carbon atoms and ethylene oxide addition products thereof;
- addition products of 15 to 60 mol ethylene oxide/polyethylene glycol onto castor oil and/or hydrogenated castor oil;
- polyol esters and, in particular, polyglycerol esters such as, for example, polyglycerol polyricinoleate, polyglycerol poly-12-hydroxystearate or polyglycerol dimerate isostearate. Mixtures of compounds from several of these classes are also suitable;
- addition products of 2 to 15 mol ethylene oxide onto castor oil and/or hydrogenated castor oil;
- partial esters based on linear, branched, unsaturated or saturated $C_{6/22}$ fatty acids, ric-inoleic acid and 12-hydroxystearic acid and glycerol, polyglycerol, pentaerythritol, -dipentaerythritol, sugar alcohols (for example sorbitol), alkyl glucosides (for example methyl glucoside, butyl glucoside, lauryl glucoside) and polyglucosides (for example cellulose);
- mono-, di and trialkyl phosphates and mono-, di- and/or tri-PEG-alkyl phosphates and salts thereof,
- wool wax alcohols;
- polysiloxane/polyalkyl polyether copolymers and corresponding derivatives;
- mixed esters of pentaerythritol, fatty acids, citric acid and fatty alcohol and/or mixed esters of $C_{6\_22}$ fatty acids, methyl glucose and polyols, preferably glycerol or polyglycerol,
- polyalkylene glycols and
- glycerol carbonate.

To provide a pleasant feeling when the composition is applied to the skin, the composition preferably comprises no polymer compound having more than 100 monomeric units, preferably no polymer compound having more than 80 monomeric units. By avoiding polymeric compounds having more than 100 monomeric units, the effect of a "film" feeling on the skin is noticeably decreased. If it is however preferred to provide water-resistance to the composition, a film-forming polymer can be included into the formulation. Film forming polymers are well known in the art and are exemplified by VP/Eicosene Coplymer (e.g. Antaron V-220 from Ashland or Unimer U-15 from Givaudan), VP/Hexadecene Coplymer (e.g. Unimer U-151 from Givaudan), Triacontanyl PVP (e.g. Unimer U-6 from Givaudan), Styrene/Acrylates Copolymer (e.g. Dermacryl E from Nouryon) without being restricted to the mentioned.

Furthermore, to impair the protective acid mantle of the skin as less as possible, the composition has preferably a pH in the range of from pH 4 to pH 7, preferably from pH 4.5 to pH 6. For adjusting the pH of the composition any suitable compound can be used, like low molecular carboxylic acids, e.g. citric acid, tartaric acid, succinic acid, maleic acid, lactic acid or NaOH, any amine, like MEA (mono ethylene amine), TEA (triethylene amine) or tetrahydroxypropyl ethylenediamine, without being restricted to the mentioned.

One further suitable and preferred ingredient of the present composition is any polyethylene glycol (PEG), wherein said PEG is added besides the polyols (iii) as mentioned above. A suitable PEG has also less than 80 ethoxy-monomers (EO units). Preferably an included PEG has not more than 30 EO units, more preferred not more than 20 EO units, even more preferred not more than 15 EO units, and most preferred not more than 10 EO units, but preferably at least 3 EO units, preferably at least 4, at least 5 or at least 6 EO units, like e.g. 6, 7, 8 or 9 EO units. A particularly preferred polyethylene glycol is PEG-8, e.g. available as Pluracare® E 400 by BASF. If present, the mentioned polyethylene glycol(s) may be incorporated in the composition in an amount of of from 2.5 to 40 wt. %, preferably from 3.5 to 30 wt. %, more preferred from 5 to 20 wt. %.

Besides the above-mentioned components, the composition may comprise further commonly used ingredients.

The composition of the present invention may optionally comprise one or more perfumes as at least one further ingredient. The perfume may be added to the composition to improve or adapt the sensorial properties of the product as desired. Suitable perfumes/fragrances can comprise, but are not limited to e.g. natural fragrances including the extracts of blossoms (lily, lavender, rose, jasmine, neroli, ylang-ylang), stems and leaves (geranium, patchouli, petitgrain), fruits (anise, coriander, caraway, juniper), fruit peel (bergamot, lemon, orange), roots (nutmeg, angelica, celery, cardamon, costus, iris, calmus), woods (pinewood, sandalwood, guaiac wood, cedarwood, rosewood), herbs and grasses (tarragon, lemon grass, sage, thyme), needles and branches (spruce, fir, pine, dwarf pine), resins and balsams (galbanum, elemi, benzoin, myrrh, olibanum, opoponax). Animal raw materials, for example civet and beaver, may also be used. Typical synthetic perfume compounds are products of the ester, ether, aldehyde, ketone, alcohol and hydrocarbon type. Examples of perfume compounds of the ester type are benzyl acetate, phenoxyethyl isobutyrate, p-tert.butyl cyclohexylacetate, linalyl acetate, dimethyl benzyl carbinyl acetate, phenyl ethyl acetate, linalyl benzoate, benzyl formate, ethylmethyl phenyl glycinate, allyl cyclohexyl propionate, styrallyl propionate and benzyl salicylate. Ethers include, for example, benzyl ethyl ether while aldehydes include, for example, the linear alkanals containing 8 to 18 carbon atoms, citral, citronellal, citronellylaxyacetaldehyd, cyclamen aldehyde, hydroxycitronellal, lilial and bourgeonal. Examples of suitable ketones are the ionones, alpha-isomethylionone and methyl cedryl ketone. Suitable alcohols are anethol, citronellol, eugenol, isoeugenol, geraniol, linalool, phenylethyl alcohol and terpineol. The hydrocarbons mainly include the terpenes and balsams. However, it is preferred to use mixtures of different perfume compounds which, together, produce an agreeable fragrance. Other suitable perfume oils are essential oils of relatively low volatility which are mostly used as aroma components.

Examples are sage oil, camomile oil, clove oil, melissa oil, mint oil, cinnamon leaf oil, lime-blossom oil, juniper berry oil, vetiver oil, olibanum oil, galbanum oil, labolanum oil and lavendin oil. The following are preferably used either individually or in the form of mixtures: bergamot oil, dihydromyrcenol, lilial, lyral, citronellol, phenylethyl alcohol, alpha-hexylcinnamaldehyde, geraniol, benzyl acetone, cyclamen aldehyde, linalool, Boisambrene Forte, Ambroxan, indole, hedione, sandelice, citrus oil, mandarin oil, orange oil, allylamyl glycolate, cyclovertal, lavendin oil, clary oil, beta-damascone, geranium oil bourbon, cyclohexyl salicylate, Vertofix Coeur, Iso-E-Super, Fixolide NP, evernyl, iraldein gamma, phenylacetic acid, geranyl acetate, benzyl acetate, rose oxide, romillat, irotyl and floramat. Also, perfumes providing a deodorizing effect can be used.

The composition of the present invention can be provided in form of a liquid, a cream, a lotion or a gel, however preferably is provided as a liquid composition, in particular in form of an aqueous composition, a W/O emulsion or an O/W emulsion. Preferred is an aqueous liquid composition. The composition may comprise water in an amount of from at least 5 wt. % to 65 wt. %, preferably at least 8 wt. % to 60 wt. %, more preferred at least 10 wt. % to 55 wt. % referring to the weight of the total composition.

Said composition preferably has a (kinetic) viscosity in the range of 0 to 200 Pa*s at 20° C., preferably 0.5 to 100 Pa-s, more preferred 0.8 to 50 Pas at 20° C., as measured according to DIN EN ISO 2555:2018 using a Brookfield viscosimeter DV-II with spindle type L2 at 100 rpm at 20° C.

If the composition is provided as a cream or a lotion, it is preferred that it comprises any suitable oil or fatty compound, e.g Guerbet alcohols based on fatty alcohols having 6 to 18, preferably 8 to 10, carbon atoms, esters of linear $C_6$-$C_{22}$-fatty acids with linear or branched $C_6$-$C_{22}$-fatty alcohols or esters of branched $C_6$-$C_{13}$-carboxylic acids with linear or branched $C_6$-$C_{22}$-fatty alcohols, such as, for example, myristyl myristate, myristyl palmitate, myristyl stearate, myristyl isostearate, myristyl oleate, myristyl behenate, myristyl erucate, cetyl myristate, cetyl palmitate, cetyl stearate, cetyl isostearate, cetyl oleate, cetyl behenate, cetyl erucate, stearyl myristate, stearyl palmitate, stearyl stearate, stearyl isostearate, stearyl oleate, stearyl behenate, stearyl erucate, isostearyl myristate, isostearyl palmitate, isostearyl stearate, isostearyl isostearate, isostearyl oleate, isostearyl behenate, isostearyl oleate, oleyl myristate, oleyl palmitate, oleyl stearate, oleyl isostearate, oleyl oleate, oleyl behenate, oleyl erucate, behenyl myristate, behenyl palmitate, behenyl stearate, behenyl isostearate, behenyl oleate, behenyl behenate, behenyl erucate, erucyl myristate, erucyl palmitate, erucyl stearate, erucyl isostearate, erucyl oleate, erucyl behenate and erucyl erucate. Also suitable are esters of linear $C_6$-$C_{22}$-fatty acids with branched alcohols, in particular 2-ethylhexanol, esters of $C_{18}$-$C_{38}$-alkylhydroxy carboxylic acids with linear or branched $C_6$-$C_{22}$-fatty alcohols, in particular Dioctyl Malate, esters of linear and/or branched fatty acids with polyhydric alcohols (such as, for example, propylene glycol, dimerdiol or trimertriol) and/or Guerbet alcohols, triglycerides based on $C_6$-$C_{10}$-fatty acids, liquid mono-/di-/triglyceride mixtures based on $C_6$-$C_{18}$-fatty acids, esters of $C_6$-$C_{22}$-fatty alcohols and/or Guerbet alcohols with aromatic carboxylic acids, in particular benzoic acid, esters of $C_2$-$C_{12}$-dicarboxylic acids with linear or branched alcohols having 1 to 22 carbon atoms or polyols having 2 to 10 carbon atoms and 2 to 6 hydroxyl groups, vegetable oils, branched primary alcohols, substituted cyclohexanes, linear and branched $C_6$-$C_{22}$-fatty alcohol carbonates, such as, for example, Dicaprylyl Carbonate (Cetiol® CC), Guerbet carbonates, based on fatty alcohols having 6 to 18, preferably 8 to 10, carbon atoms, esters of benzoic acid with linear and/or branched $C_6$-$C_{22}$-alcohols (e.g. Finsolv® TN), linear or branched, symmetrical or asymmetrical dialkyl ethers having 6 to 22 carbon atoms per alkyl group, such as, for example, dicaprylyl ether (Cetiol® OE), ring-opening products of epoxidized fatty acid esters with polyols, silicone oils (cyclomethicones, silicone methicone grades, etc.), aliphatic or naphthenic hydrocarbons, such as, for example, squalane, squalene or dialkylcyclohexanes, and/or mineral oils.

The repellent composition of the present invention preferably has such a low viscosity that it is sprayable, thus, it can be provided in a container equipped with a spraying device. Said spraying device can be a pump spray device or it can be an aerosol spraying device, both types of devices allow to spray said repellent composition in form of small droplets, With "small droplets" is meant that the composition is provided in form of droplets having a droplet size in the range of from 5 nm to 500 μm, preferably 50 nm to 200 μm, more preferred 100 nm to 100 μm, even more preferred 500 nm to 50 μm and most preferred 1 to 50 μm.

Accordingly, it is preferred that the repellent composition of the present invention is provided in a pump spray container or in an aerosol can. If an aerosol can is used, said can or said composition advantageously comprises further a suitable propellant gas, e.g. propane and/or butane.

The present repellent composition is suitable to be used for repelling insects and/or ticks from contacting human or animal skin and therefore to repel them from stinging said human or animal. Due to its particular component combination the repellent composition of the present invention provides an extended protection against Arthropoda species compared to compositions presently offered on the market. Therefore, the repellent composition as described herein can be used in a less amount and/or has not to be applied less often compared to compositions known in the market. The present repellent composition can be e.g. applied once in the morning and once in the evening, e.g. before going to bed, due to the effective protection of up to a 12 hours period. Protection is preferably obtained by applying the composition, e.g. by spraying, uniformly distributed onto the non-covered human or animal skin.

EXAMPLES

The following Examples show the effect of compositions according to the invention (E) in comparison to compositions not falling under the invention (V) to repel Mosquitoes *Aedes aegypti* from biting a human volunteer Female mosquitoes belonging to the genus *Aedes* were reared according to a standard protocol at a temperature of 27.5±0.5° C., a relative humidity of 65-85% and a 12:12 hour photo period. The light period (450 Lux) was set from 8:00 to 20:00. After hatching from the eggs, larvae were kept in water basins (30×30×10 cm) filled with a 1:1 mixture of deoxygenized tap- and deionized water and fed with fish food flakes (Tetra Min®). Prior to the emergence, pupae were transferred to a holding cage (40×30×20 cm). Adult mosquitoes were provided with sugar solution (10% dextrose) and used at an age of 5 to 15 days for the repellent tests.

30 of the mosquitos each have been placed into test cages having a volume of 27.000 $cm^3$ (41×41×16 cm). Cage tests have been carried out in a climatized room (4.5×4.5×2.5 m) without windows at a temperature of 27.5±0.5° C. and a relative humidity of 65±5% rF. The light intensity was 450 Lux.

For the Examples aqueous compositions were prepared comprising besides water and the below specified ingredients a suitable amount of PEG-8 (between 10 and 25 wt. %) and an amount of ethanol.

A quantity of the respective compositions as defined in Table 1 below was applied to a defined area on the forearms of volunteers (carried out as triple test, n=3). Prior to the application the skin was washed with fragrance-free soap, rinsed with water and wiped with 50% isopropyl alcohol. An area larger than the test window was marked to ensure that the exposed skin was entirely treated with repellent substance. The marked area had a size of ca. 100 cm².

Test formulations were applied to a defined area on one forearm of each volunteer. Zero control tests were performed prior to each individual efficacy test and the exact time until 10 landings occurred was documented. With this time value, repellent protection on the treated arm could be calculated according to the following formula:

$$\text{Protection in \%} = 100 - \frac{\sum \text{of probings on treated skin per time unit}}{\sum \text{of probings on untreated skin per time unit}} \times 100$$

Repellent efficacy was verified for the first time shortly after product application and then again in regular 30 minutes intervals up to a maximum of 8 hours (Example V2 12 hours) or until repellency failed. Each single test lasted 2 minutes, during this time the number of landings and bites on the treated skin were recorded.

Repellent efficacy was evaluated using 1. the time until first bite, 2. the time until protection from bites reached less than 95% compared to untreated skin (several bites within the same time frame).

The <95% value represents the end of complete protection time and is used as the criterion for break-off for repellent tests.

Tests were conducted with three volunteers. All volunteers were attractive to the test mosquito species, thereby meeting the requirements to participate in repellent efficacy studies. Each volunteer received his or her own cage. Cages were connected to the air ventilation system in between single tests (zero control and efficacy test) to avoid an accumulation of host odors and active ingredients inside the cage. Test mosquitoes that started to engorge blood during a test were replaced by new individuals to ensure that the number of host-seeking females stayed constant throughout the test day.

noticeable increase in the time period protecting the skin against the first insect bite (see V6 vs E1), in fact the addition extends the time up to the first bite to become longer than for twice the amount of Icaridin (E1 vs. V7). However, only a slight effect can be observed for the addition of PPG-20 methyl glucose ether to the repellent PMD (see V1 vs. V3 and V2 vs. V4). Even if a considerable higher amount of PMD and PPG-20 methyl glucose ether is combined (V5 vs. V4), no convincing effect can be obtained.

IF PPG-20 methyl glucose ether is added to a composition comprising a combination of Icaridin and PMD, both the time period until the insects bite the first time and the time until the repellent protection falls below 95% can be considerably extended (see E2) compared to all the other compositions, This effect was not foreseeable, since in E2 both repellents are present on the skin at the same time, thus, it would have been expected that for the combination of these two repellents an effective time should be obtained comparable to the time provided by Icaridin alone (which clearly is exceeding the effective time of PMD). Thus, the combination of the three ingredients Icaridin, PMD and PPG-20 methyl glucose ether result in a repellent having a superior effect compared to the single repellents.

The invention claimed is:

1. An Arthropoda repellent composition, comprising
   (i) icaridin (1-(1-methylpropoxycarbonyl)-2-(2-hydroxyethyl)piperidine) in an amount from 10 wt. % to 20 wt. %,
   (ii) PMD (para-menthan-3,8-diol) in an amount from 10 wt. % to 20 wt. % and optionally at least one further Arthropoda repellent compound selected from DEET (N,N-diethyl-m-methylbenzamide), IR 3535 (ethyl-3-acetylbutylaminopropanoate), KBR 3023 ((RS)-sec-butyl-(RS)-2-(2hydroxyethyl) piperidine-1-carboxylate), and ethyl antranilate (ethyl-2-aminobenzoate), and
   (iii) at least PPG-20 methyl glucose ether in an amount of from 0.1 wt. % to 1.5 wt. %, and optionally at least one further polyol, selected from PPG-10 methyl glucose ether, propylene glycol, butylene glycol, and pentylene glycol.

2. An Arthropoda repellent composition according to claim 1, wherein the at least one further polyol is selected from propylene glycol and pentylene glycol.

3. An Arthropoda repellent composition of claim 1, wherein the total amount of Arthropoda repellent com-

TABLE 1

| Example | Amount PMD [1] | Amount Icaridin [2] | Amount Glucam [3] | application | First bite [hours] | <95% [hours] |
|---------|---------|----------|---------|-------------|---------------|--------------|
| V1 | 10% | | | 1.67 mg/cm² | 2.5 +/− 0.5 | |
| V2 | 10% | | | 4 mg/cm² | 3.5 +/− 0.5 | |
| V3 | 10% | | 0.5% | 1.67 mg/cm² | 2.8 +/− 0.62 | 3.5 +/− 1.71 |
| V4 | 10% | | 0.5% | 4 mg/cm² | 4.2 +/− 1.03 | |
| V5 | 25% | | 2.0% | 4 mg/cm² | 4.5 +/− 0.6 | |
| V6 | | 10% | | 1.67 mg/cm² | 2.83 +/− 0.24 | 7.0 +/− 1.1 |
| E1 | | 10% | 0.5% | 1.67 mg/cm² | 4.5 +/− 2.68 | 7.33 +/− 0.62 |
| V7 | | 20% | | 1.67 mg/cm² | 4.0 +/− 1.3 | 8 +/− 1 |
| E2 | 10% | 20% | 0.5% | 1.67 mg/cm² | 8.0 +/− 0 [4] | 12 [5] |

[1] (1-(1-methylpropoxycarbonyl)-2-(2-hydroxyethyl)piperidine
[2] para-menthan-3,8-diol
[3] PPG-20 methyl glucose ether
[4] No bite within 8 hours, next value was taken at 12 hours
[5] Experiment stopped at 12 hours As can be seen by the Examples the addition of PPG-20 methyl glucose ether to the repellent Icaridin provides a pounds in the composition ranges from 20 wt. % to 60 wt. %, referring to the weight of the total composition.

4. An Arthropoda repellent composition of claim 1, wherein the total amount of said polyols in the composition ranges from 0.2 wt. % to 20 wt. %, referring to the weight of the total composition.

5. An Arthropoda repellent composition of claim 1, comprising icaridin and PMD in a weight ratio of from 3:1 to 1:2.

6. An Arthropoda repellent composition of claim 1, comprising
   (i) not more than 30 wt. % of any C1-5 alcohol, and/or
   (ii) no polymer compound having more than 100 monomeric units, and/or
   (iii) less than 5 wt. % of any surfactant.

7. An Arthropoda repellent composition of claim 1, fulfilling at least one of the following:
   (i) the composition is a liquid, a cream, a lotion, or a gel,
   (ii) the composition comprises water in an amount of from at least 5 wt. % to 65 wt. %, referring to the weight of the total composition,
   (iii) the composition has a viscosity of 0 to 200 Pa*s at 20° C.

8. An Arthropoda repellent composition of claim 1, comprising besides the polyols (iii) further a polyethylene glycol with a maximum of 80 EO units.

9. An Arthropoda repellent composition of claim 1, having a pH in a range of from pH 4 to pH 7.

10. An Arthropoda repellent composition of claim 1 provided in a container having a spraying device allowing to spray said composition in a form of fine droplets.

11. Use of the Arthropoda repellent composition of claim 1 to repel insects and/or ticks from contacting human or animal skin and/or from stinging.

12. A method for repelling insects or ticks from contacting human or animal skin and/or from stinging, comprising applying the Arthropoda repelling composition of claim 1 to the skin of the human or animal.

13. An Arthropoda repellent composition of claim 1, wherein the at least one further polyol is present.

14. An Arthropoda repellent composition of claim 13, wherein the at least one further polyol comprises PPG-10 methyl glucose ether.

15. An Arthropoda repellent composition of claim 13, wherein the at least one further polyol comprises propylene glycol.

16. An Arthropoda repellent composition of claim 13, wherein the at least one further polyol comprises butylene glycol.

17. An Arthropoda repellent composition of claim 13, wherein the at least one further polyol comprises pentylene glycol.

18. An Arthropoda repellent composition of claim 1, wherein the at least one further Arthropoda repellent compound is present.

19. An Arthropoda repellent composition of claim 1, wherein PPG-20 methyl glucose ether is present in an amount of about 0.5 wt. %.

20. An Arthropoda repellent composition of claim 1, wherein PPG-20 methyl glucose ether is present in an amount of 0.5 wt. %.

* * * * *